(12) United States Patent
Jeschke et al.

(10) Patent No.: US 6,389,265 B1
(45) Date of Patent: May 14, 2002

(54) TRANSMIT POWER CORRECTION IN A MOBILE COMMUNICATIONS SYSTEM

(75) Inventors: Michael Jeschke, Stuttgart; Ivar Mortensen, Korntal, both of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/317,450

(22) Filed: May 24, 1999

(30) Foreign Application Priority Data

Apr. 1, 1999 (EP) ............................................. 99440067

(51) Int. Cl.$^7$ ................................................ H04Q 7/20
(52) U.S. Cl. ........................ 455/69; 455/522; 455/453
(58) Field of Search ............................ 455/69, 70, 522, 455/67.1, 453

(56) References Cited

U.S. PATENT DOCUMENTS

| | | | | |
|---|---|---|---|---|
| 6,067,446 A | * | 5/2000 | Persson et al. | 455/69 |
| 6,085,108 A | * | 7/2000 | Knutsson et al. | 455/522 |
| 6,181,919 B1 | * | 1/2001 | Ozluturk | 455/69 |

FOREIGN PATENT DOCUMENTS

| | | |
|---|---|---|
| EP | 0 680 160 A2 | 11/1995 |
| WO | WO 97/07600 | 2/1997 |
| WO | WO 98/02981 | 1/1998 |
| WO | WO 98/56200 | 12/1998 |

* cited by examiner

*Primary Examiner*—Nay Maung
(74) *Attorney, Agent, or Firm*—Sughrue Mion, PLLC

(57) ABSTRACT

In a UMTS (Universal Mobile Telecommunications System) wherein multiple base stations are able to communicate simultaneously with the same mobile station, with forward direction power control where the mobile station sends a transmit power control command to all base stations serving it, a "feedback-type transmit power correction" is implemented wherein information (PL1, PL2) is transmitted about the current transmitted powers from the base stations (NB1, NB2) to a base station controller (SRNC) which evaluates this information to calculate a correction value (CV1) for the power transmitted by at least one (NB1) of the base stations, which then additionally changes its transmitted power by this correction value (CV1)."

16 Claims, 3 Drawing Sheets

TRANSMIT POWER CORRECTION IN A MOBILE COMMUNICATIONS SYSTEM

BACKGROUND OF THE INVENTION

Conventional mobile communications systems, particularly cellular systems, contain a number of base stations which communicate with mobile stations. If at least two base stations communicate simultaneously with the same mobile station, so-called macrodiversity transmission takes place. This mode of transmission is used, for example, in code division multiple access (CDMA) mobile communications systems. In the planned mobile communications system UMTS (universal mobile telecommunications system), macrodiversity transmission is to be used at least during handoff of the mobile station from one base station to another. In the UMTS, the powers transmitted by the base stations must be adapted as quickly as possible to changes in channel characteristics, which are caused by fading, for example. The mobile station sends to all base stations serving it a transmit power control (TPC) command instructing them to change their transmitted powers, namely to raise or lower the transmitted power level by a predetermined amount of, e.g., 1 dB. This process thus represents a closed-loop power control mechanism.

SUMMARY OF THE INVENTION

The invention is predicated on recognition that the following problem arises if TPC commands are detected in error. If one of the base stations receives the TPC command incorrectly, it will change its transmitted power incorrectly as compared with those base stations which receive the TPC command correctly.

This means that this individual base station will change its transmitted power in the opposite sense to the other base stations. Accordingly, the transmitted power levels will drift apart ("random walk"). This drift reduces the desired macrodiversity gain. To prevent this drift, according to the invention, information about the powers currently being transmitted by the base stations is transmitted at predeterminable time intervals to a base station controller which evaluates this information to calculate a power correction value for at least one of the base stations, and the base station controller transmits the correction value to the base station, which then additionally changes its transmitted power by this correction value. Accordingly, the transmitted power levels are monitored by the base station controller at regular time intervals in order to determine whether the transmitted power levels are drifting apart, and to perform a transmit power correction in at least one of the base stations if necessary. Thus, in addition to executing the known change in transmitted power in response to the TPC command, the base station to which a correction value is communicated will correct this change if a drift of the transmitted power levels is detected.

This method, in which the decision of the base station controller to instruct a base station to correct its transmitted power is made based on feedback information (transmit level data) about the actual transmitted powers of the base stations, will be referred to herein as "feedback-type transmit power correction". One advantage of the proposed method is that the transmitted power levels cannot drift very far apart, because the transmitted power is corrected right at the beginning of a drift.

Further advantageous aspects of the invention are defined in the subclaims.

BRIEF DESCRIPTION OF THE DRAWING

The invention and its advantages will become more apparent from the following description of an embodiment when taken in conjunction with the accompanying schematic drawings, in which.

DETAILED DESCRIPTION OF THE INVENTION

Figure 1A:
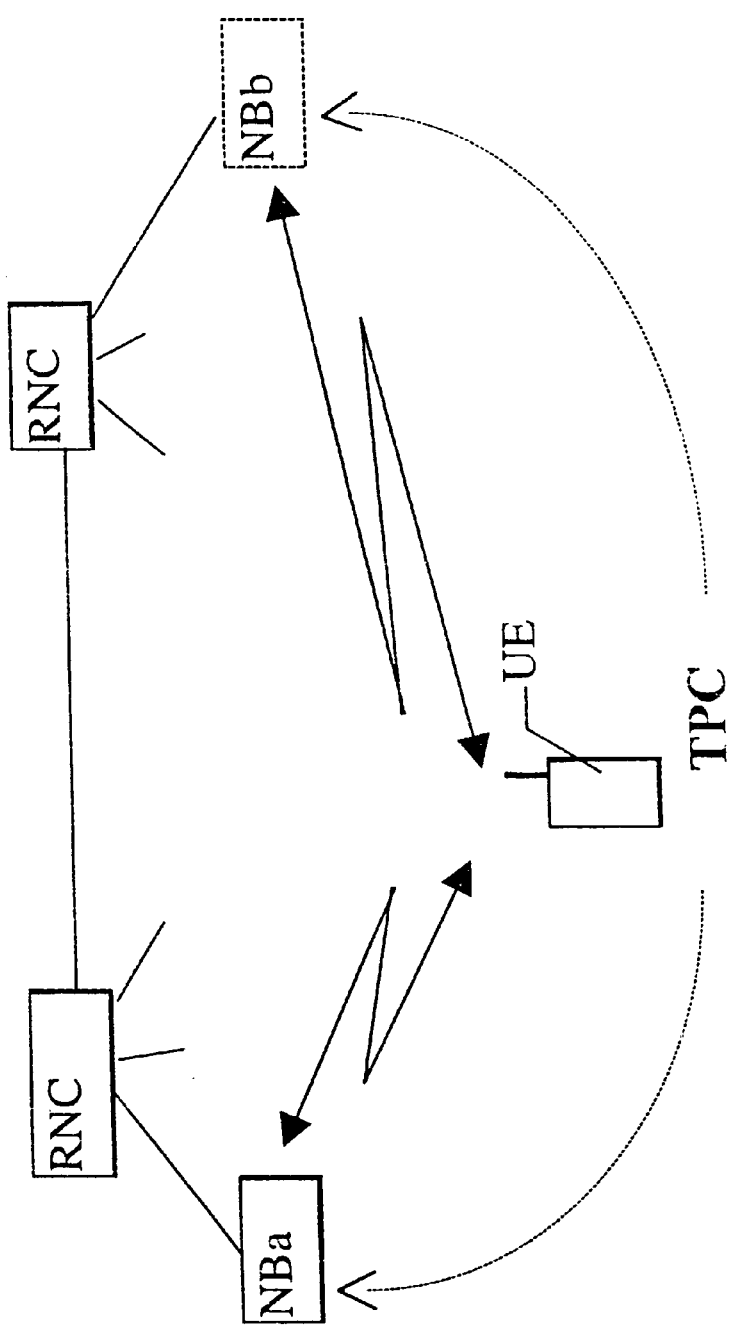
FIG. 1a shows the structure of a conventional mobile communications system.

FIG. 1a shows a conventional mobile communications system with at least two base stations NBa and NBb which are interconnected via a control network and are communicating with a mobile station UE. The control network contains radio network controllers RNC via which the base stations are connected with one another and with telecommunications networks, such as the public switched telephone network (PSTN). FIG. 1a shows a macrodiversity situation, in which the two base stations NBa and NBb communicate with the mobile station UE simultaneously. To control the transmitted powers in the individual base stations, the mobile station UE sends a uniform command, the TPC command, to the two base stations NBa and NBb at regular intervals. The two base stations evaluate the received TPC command and change their transmitted powers. The TPC command indicates whether the transmitted power is to be increased or decreased. Only if both base stations receive the TPC command correctly will they change their transmitted powers in the same sense.

Figure 1B:
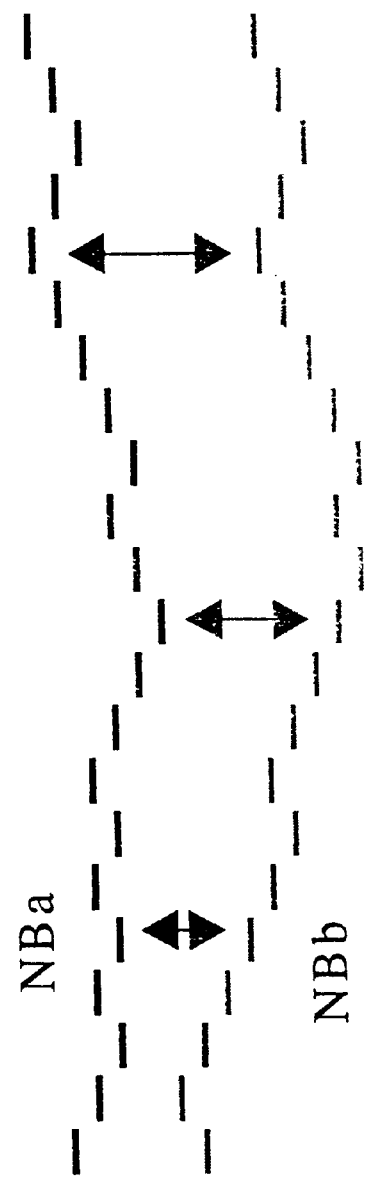
FIG. 1b shows the time variation of the transmitted power levels and the conventionally occurring drift.

FIG. 1b shows the time variation of the transmitted power levels for the two base stations NBa and NBb if an incorrect reception of the TPC command occurs from time to time. As the transmitted powers do not change in the same sense, the two transmitted power levels gradually move away from each other, i.e., the above-mentioned undesired drift occurs.

Figures 2A, 2B:
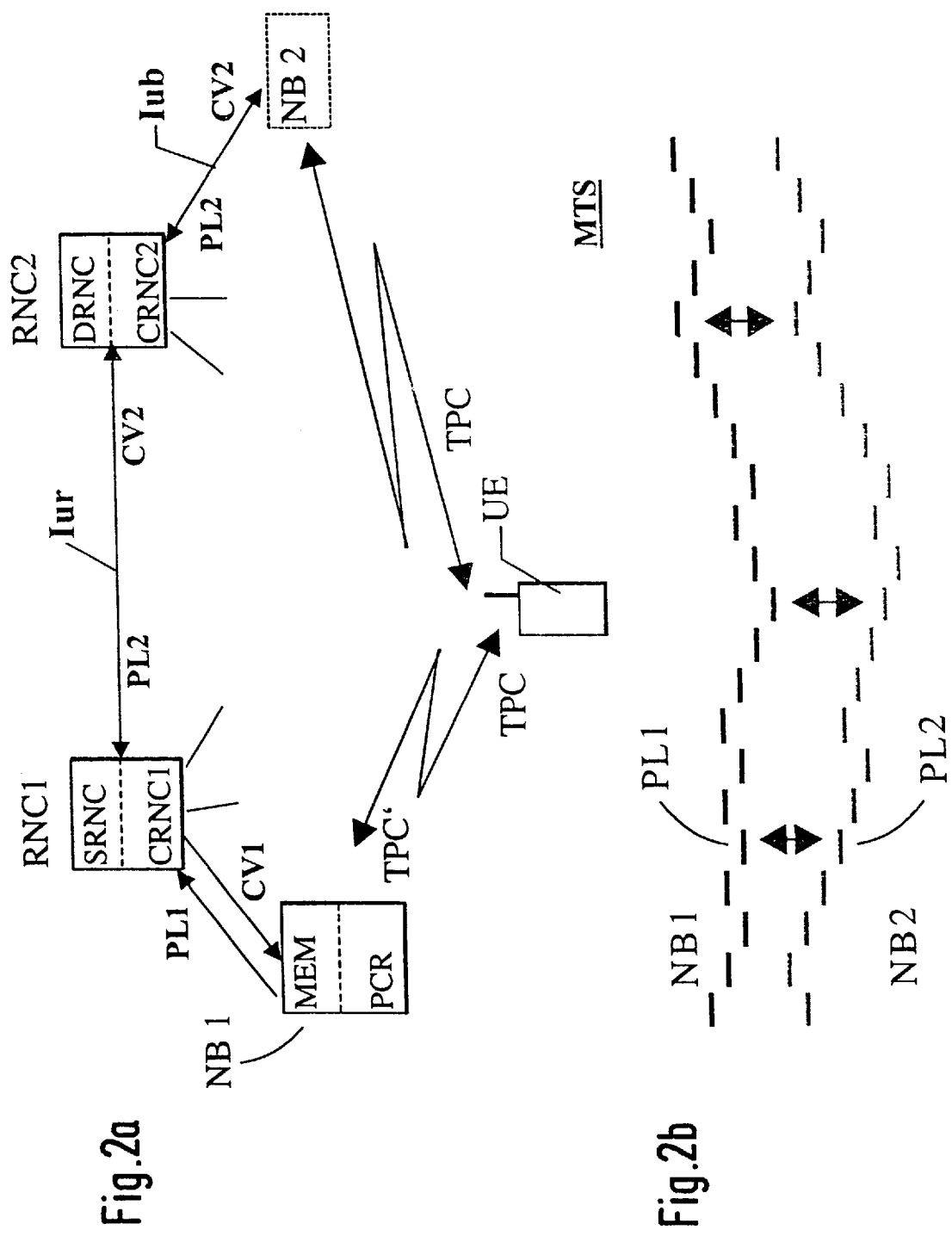
FIG. 2a shows the structure of a mobile communications system in accordance with the invention.
FIG. 2b shows the improved time variation of the transmitted power levels as is caused by a method in accordance with the invention.

FIG. 2a shows the structure of a mobile communications system MTS according to the invention, in which this problem does not arise. The mobile communications system contains a number of base stations, of which only two, NB1 and NB2, are shown. These two base stations NB1 and NB2 are interconnected via a control network and communicate simultaneously, at least temporarily, with a mobile station UE. This means that, at least temporarily, macrodiversity transmission takes place. The control network contains two radio network controllers RNC1 and RNC2 which interconnect the base stations NB1 and NB2, and one of which, RNC1, establishes a connection to a telecommunications network (not shown). Each of these radio network controllers RNC1 and RNC2 can be divided into two functional units SRNC, CRNC1 and DRNC, CRNC2, respectively.

The first radio network controller RNC1 has a first base station controller SRNC, which controls the above-mentioned macrodiversity transmission. The second radio network controller RNC2 has a second base station controller DRNC, which supports the first base station controller SRNC. Accordingly, these base station controllers SRNC and DRNC control functions relating to the macrodiversity for the mobile station UE.

In addition, the two radio network controllers RNC1 and RNC2 comprise further base station controllers CRNC1 and CRNC2, respectively, which are essentially designed to monitor the radio transmissions of the base stations connected thereto, for example to provide radio resource management functions, and not to provide macrodiversity control functions.

Signaling between the two radio network controllers RNC1 and RNC2 is effected via a first interface Iur. Signaling between the radio network controller RNC1 and the base station NB1 and between the radio network controller RNC2 and the base station NB2 is effected via respective second interfaces Iub. The interfaces Iur and Iub are described in more detail below.

Each of the two base stations NB1 and NB2 changes its transmitted power using the method according to the invention, wherein the first base station controller calculates correction values CV1 and CV2 for additional transmit power corrections and communicates them to the base stations NB1 and NB2, respectively, in order to correct the power currently being transmitted there if the first base station controller SRNC detects a drift of the transmitted power levels. The method will now be described in more detail with reference to FIG. 3 and to FIG. 2b, which illustrates the effect of the method.

FIG. 2b shows the time variation of the transmitted power levels, which, as a result of the measures according to the invention, do not drift apart. The representation in FIG. 2b is based on the same error pattern in the reception of the TPC commands as the representation in FIG. 1b. A comparison of the two figures clearly shows the improvement obtained by the novel method, a feedback-type transmit power correction.

Figure 3:
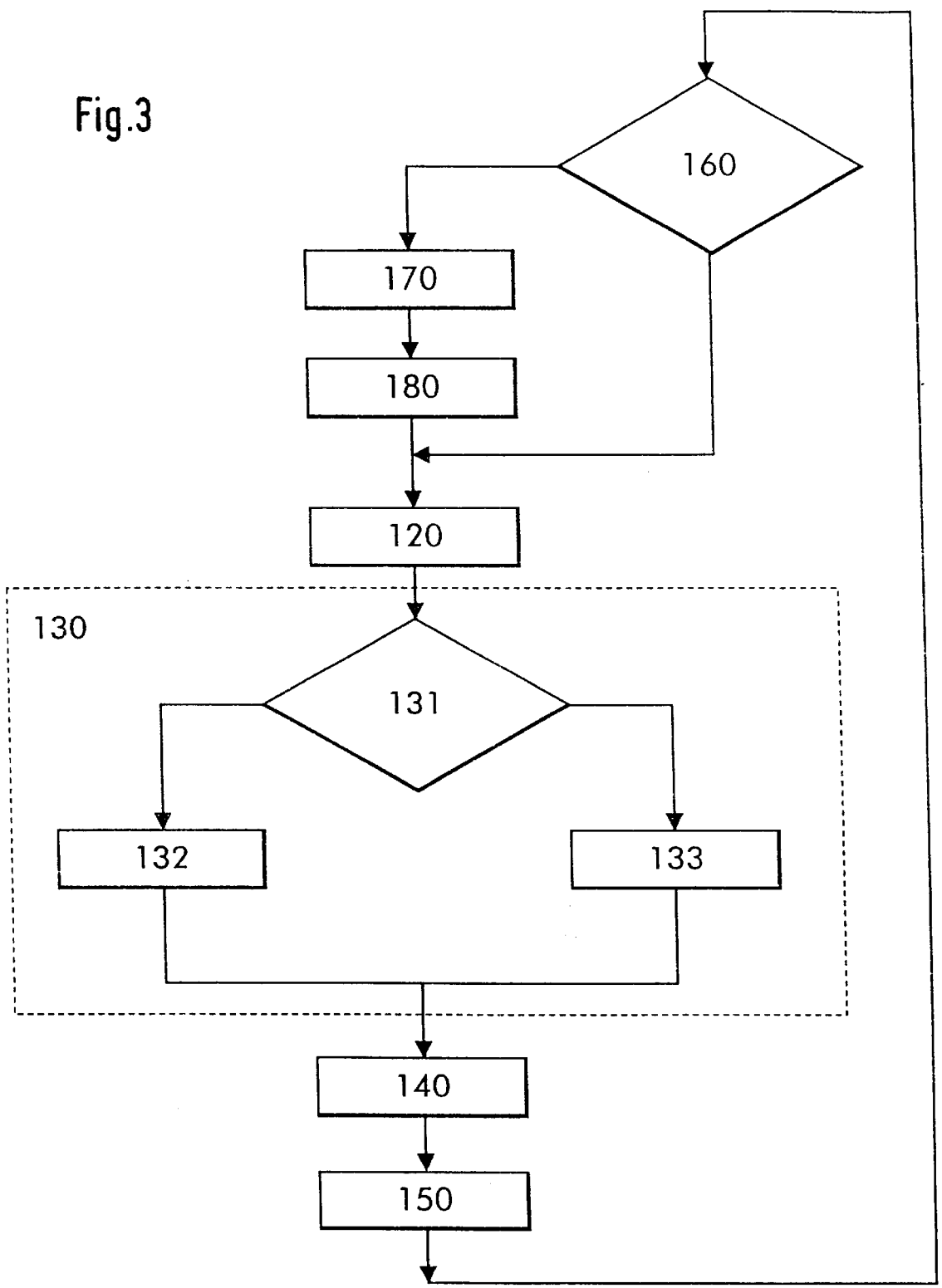
FIG. 3 is a flowchart showing the steps of the method in accordance with the invention.

FIG. 3 is a flowchart showing the steps of such a method 100 for changing the transmitted power in a base station. The term "transmitted power" as used herein means the power required in the forward direction to provide radio services over macrodiversity channels. The radio services used by a single mobile station are considered here, with the transmitted power relating to a cell which is served by one of the base stations.

The method 100 relates to the change in the power transmitted by the base station NB1 of FIG. 2a, and comprises steps 120 to 180. No consideration will be given to the fact that in the mobile communications system the method described in the following is also applied to the other base station NB2. Transmission is time-division multiplex, i.e., the radio signals are transmitted in time slots, with several time slots forming a frame. In this example, a frame contains 16 time slots. The implementation of the method 100 is considered here for a duration of 17 time slots, numbered (not shown) from k−1 to k+15 (k is a count with the start value k=0). This means that the period from the end of a frame (time slot k−1) to the end of the next frame (time slot k+15) is considered.

At the end of the first frame (time slot k−1), the below-described steps 170 and 180 where already performed. In these steps, a drift was detected and a correction value CV1 was calculated for the next frame (time slots k to k+15). This correction value CV1 is sent by the base station controller SRNC via the interface Iub to the base station NB1. If no correction of the transmitted power is necessary, the correction value is zero or no correction value is sent. In this embodiment, however, a drift of the transmitted power levels was observed and the correction value calculated by the base station controller SRNC is CV1=−2dB.

In a step 120, this correction value CV1 is received by the base station NB1 and stored in the memory MEM, which is accessed by the transmit power controller PCR (see FIG. 2a).

In this example, a user data signal is sent by both base stations NB1 and NB2 to the mobile station UE simultaneously in time slot k−1, with the base stations NB1 and NB2 transmitting at powers of 20 dBm and 18 dBm, respectively.

In response to this signal, the mobile station UE sends a command TPC in the reverse direction in order to indicate to the two base stations NB1 and NB2 that the transmitted powers have to be changed. In this example, the mobile stations wants to increase its transmitted power by +1 dB for the next time slot k. This command TPC, too, is received by the base station NB1 in step 120.

In a step 130, the change in transmitted power is executed in the conventional manner, which will now be described by the example of the base station NB1. In a partial step 131, the base station NB1 evaluates the command TPC' received by it. If the base station NB1 has received the command correctly, i.e., if the received command TPC' is equal to the transmitted command TPC, it determines that the transmitted power must be increased, and goes to a partial step 132, in which it increases the transmitted power by a fixed amount of 1 dB. If the command is received in error (TPC' not equal to TPC), in a step 133 the transmitted power—contrary to the wish of the mobile station—will be decreased. This decrease amounts to −1 dB. Thus, in step 130, the transmitted power is changed solely by taking account of the received command TPC'.

This is followed by a step 140, in which the transmitted power is additionally changed by the transmit power controller PCR of the base station NB1 based on the predetermined correction value CV1, because a drift of the transmitted power levels was observed in step 170, so that the power transmitted by the base station NB1 must be slightly decreased. The correction value CV1 is stored in the memory MEM. The transmitted power level increased by +1 dB by the transmit power controller PCR of the base station NB1 in step 130 is now reduced by a partial amount of the correction value CV1, namely by CV1/16=−2 dB/16=−0.125 dB. Compared to the conventional change in transmitted power by 1 dB in step 130, this additional change in step 140 is smaller, thus leading to a soft correction of the transmitted power.

In step 150, the base station NB1 then transmits in the current time slot at the corrected power.

In step 160, a check is made to determine whether the end of the frame has been reached. If that is not the case (time slots k, k+1, k+2, ..., k+14), steps 120 to 150 are repeated. With each repetition, the transmitted power is corrected by the partial amount CV1/16=−0.125 dB, so that after 16 passes through steps 120 to 150, i.e., at the end of the frame, the correction by the value CV1=−2 dB is complete. When the end of the frame has been reached (k+15), a step 170 follows.

In step 170, the base station NB1 communicates to the base station controller SRNC via the interface Iub its transmitted power PL1, which now corresponds to the completely corrected transmitted power. The other base station NB2 signals its transmitted power, too. In a next step 180, the information just received and the information received in earlier frames are evaluated to determine whether the transmitted power levels are still drifting apart, and to calculate a new correction value if necessary.

The feedback of the current transmitted power levels is effected on a frame-by-frame basis. A drift can be determined by observing the levels over several frames. For at least one of the two base stations, a correction value must be calculated to compensate for the undesired deviation of the transmitted power levels. It is also possible, as in this example, to calculate a correction value for each of the two base stations NB1 and NB2 in order to bring the two drifting transmitted power levels closer together again. The base station controller SNRC shown in FIG. 2a calculates, for example, the correction value CV1=−2 dB for the base station NB1 and the correction value CV2=+1 dB for the base station NB2.

Besides the information about the actual transmitted powers PL1 and PL2 fed back by the base stations, various further criteria can be used to calculate the correction values:

The radio path losses in the forward direction.

The respective traffic loads in the cells of NB1 and NB2 in the forward direction. These traffic loads are determined by the base stations NB1 and NB2 or by the respective base station controllers connected thereto, CRNC1 and CRNC2, and communicated to the base station controller SRNC.

Instead of signaling absolute transmitted powers (dBm or watt values), relative power values (dB values) can be transmitted which are obtained by accumulating the changes in transmitted power that have occurred since the preceding communication of the transmitted power. This approach corresponds to a short-time integration, which also can indicate a drift of the transmitted power levels.

The following, particularly simple correction of the transmitted power is also possible. The additional change in transmitted power by the correction value is caused to act on the conventional change executed in response to the TPC command by checking whether this change aims in a direction equal to a direction indicated by the correction value, and by ignoring the command and not executing this change if the two directions are not equal. If, for example, the transmitted power is to be increased by +1 dB in response to TPC command, and a correction by −1 dB is indicated, the TPC command will be ignored and not be executed. Accordingly, the transmitted power level remains unchanged.

The method described can be used to advantage for transmission in the so-called SSDT mode (SSDT=site selection diversity transmit power control), which is known per se from the standardization of the UMTS:

In the SSDT mode, a base station involved in a macrodiversity transmission transmits the control part of the signals with a first power level (power p1). The data part is transmitted with this power level (p1) only if the base station serves a so-called primary cell. If the status is changed and a so-called non-primary cell is served, the data part is transmitted with a second, lower power level (p2<p1), which can even be zero (p2=0). In the SSDT mode, the invention described can be applied to any base station if the transmitted power (PL1 in FIG. 2a) communicated by the base station to the base station controller SRNC relates to the first transmitted power level (p1) and the transmit power controller PCR in the base station acts on this transmitted power level (p1).

What is claimed is:

1. A method (100) of changing the powers transmitted by at least two base stations (NB1, NB2) communicating simultaneously, at least temporarily, with a mobile station (UE) in a mobile communications system (MTS), said method (100) comprising the steps of: sending from the mobile station (UE) to the base stations (NB1, NB2) a command (TPC) instructing the base stations (NB1, NB2) to change their transmitted powers (120); changing the transmitted power in each (NB1) of the base stations in response to the command (TPC) (130); transmitting, at presettable time intervals, information (PL1, PL2) from the base stations (NB1, NB2) to a base station controller (SRNC) about the powers currently being transmitted by the base stations (NB1, NB2); evaluating said information (PL1, PL2) in the base station controller (SRCN) to calculate a correction value (CV1) for the power transmitted by at least one (NB1) of the base stations and communicating said correction value (CV1) to said base station (NB1); and additionally changing the transmitted power in said base station (NB1) by said correction value (CV1) (140); wherein each of the base stations (NB1, NB2) determines its traffic load in the forward direction and communicates the respective traffic load to the base station controller (SRNC); and wherein the base station controller (SRNC) calculates the correction value (CV1) based on the respective traffic loads (140).

2. A method (100) as claimed in claim 1 wherein the additional change in transmitted power is executed successively by changing the transmitted power periodically by respective partial amounts of the correction value (CV1) (140).

3. A method as claimed in claim 1 wherein the additional change in transmitted power is caused to act on the change executed in response to the command (TPC) by checking whether said change aims in a direction equal to a direction indicated by the correction value (CV1), and by ignoring the command (TPC) and not executing said change if the two directions are not equal.

4. A method as claimed in claim 1 wherein the information transmitted from the base station to the base station controller contains a value specifying the change in transmitted power accumulated over a predetermined period of time.

5. A method (100) as claimed in claim 1 wherein the base station controller (SRNC) calculates the correction value (CV1) based on radio path losses in the forward direction which are determined by measurements on a broadcast signaling channel (140).

6. A base station (NB1) for a mobile communications system (MTS) which is connected to a base station controller (SRNC), comprises a memory (MEM) and a transmit power controller (PCR) connected thereto, receives a command (TPC) from a mobile station (UE), changes its transmitted power in response to the command (TPC) by means of the transmit power controller (PCR), transmits information (PL1) about its current transmitted power to the base station controller (SRNC), receives from the base station controller (SRNC) a correction value (CV1) for its transmitted power, stores the correction value (CV1) in the memory (MEM), and additionally changes its transmitted power by said correction value (CV1) by means of the transmit power controller (PRC); wherein the base station (NB1) is structured to determine its traffic load in the forward direction and to communicate the traffic load to the base station controller (SRNC); and wherein the base station controller (SRNC) is structured to calculate the correction value (CV1) based on the traffic load (140).

7. A base station controller (SRNC) which is connected to at least two base stations (NB1, NB2) in a mobile communications systems (MTS), receives information (PL1; PL2) about its current transmitted power from said base stations (NB1, NB2) and evaluates said information, calculates a correction value (CV1) for at least one (NB1) of the base stations therefrom, and, in addition to changing its transmitted power in response to a command (TCP) from a mobile station (UE), changes its transmitted power by said correction value (CV1); wherein each of the base stations (NB1, NB2) is structured to determine its traffic load in the forward direction and to communicate the respective traffic load to the base station controller (SRNC); and wherein the base station controller (SRNC) is structured to calculate the correction value (CV1) based on the respective traffic loads (140).

8. A mobile communications system (MTS) comprising: at least two base stations (NB1, NB2) communicating simultaneously, at least temporarily, with a mobile station (UE), the mobile station (UE) sending to the base stations (NB1, NB2) a command (TPC) instructing the base stations (NB1, NB2) to change their transmitted powers, each (NB1) of the base stations comprising a memory (MEM) and a transmit power controller (PCR) connected thereto for changing its transmitted;power in response to the command (TPC); and at least one base station controller (SRNC) to which each of the base stations (NB1, NB2) transmits information (PL1, PL2) about its current transmitted power, and which calculates a correction value (CV1) for the power transmitted by at least one (NB1) of the base stations and transmits it to said base station (NB1), which stores the correction value (CV1) in the memory (MEM) in order to additionally change its transmitted power by said correction value (CV1) by means of the transmit power controller (PCR); wherein each of the base stations (NB1, NB2) is structured to determine its traffic load in the forward direction and to communicate the respective traffic load to the base station controller (SRNC); and wherein the base station controller (SRNC) is structured to calculate the correction value (CV1) based on the respective traffic loads (140).

9. A method (100) of changing the powers transmitted by at least two base stations (NB1, NB2) communicating simultaneously, at least temporarily, with a mobile station (UE) in a mobile communications system (MTS), said method (100) comprising the steps of: sending from the mobile station (UE) to the base stations (NB1, NB2) a command (TPC) instructing the base stations (NB1, NB2) to change their transmitted powers (120); changing the transmitted power in each (NB1) of the base stations in response to the command (TPC) (130); transmitting, at presettable time intervals, information (PL1, PL2) from the base stations (NB1, NB2) to a base station controller (SRNC) about the powers currently being transmitted by the base stations (NB1, NB2); evaluating said information (PL1, PL2) in the base station controller (SRCN) to calculate a correction value (CV1) for the power transmitted by at least one (NB1) of the base stations and communicating said correction value (CV1) to said base station (NB1); and additionally changing the transmitted power in said base station (NB1) by said correction value (CV1) (140); wherein the base station controllers (CRNC1, CRNC2) connected directly to the base stations (NB1, NB2) determine the traffic loads in the forward direction and communicate the traffic loads to the base station controller (SRNC), which calculates the correction value (CV1) based on the traffic loads.

10. The method as claimed in claim 9, wherein the additional change in transmitted power is executed successively by changing the transmitted power periodically by respective partial amounts of the correction value (CV1) (140).

11. The method as claimed in claim 9, wherein the additional change in transmitted power is caused to act on the change executed in response to the command (TPC) by checking whether said change aims in a direction equal to a direction indicated by the correction value (CV1), and by ignoring the command (TPC) and not executing said change if the two directions are not equal.

12. The method as claimed in claim 9, wherein the information transmitted from the base station to the base station controller contains a value specifying the change in transmitted power accumulated over a predetermined period of time.

13. The method as claimed in claim 9, wherein the base station controller (SRNC) calculates the correction value (CV1) based on radio path losses in the forward direction which are determined by measurements on a broadcast signaling channel (140).

14. A base station (NB1) for a mobile communications system (MTS) which is connected to a base station controller (SRNC), comprises a memory (MEM) and a transmit power controller (PCR) connected thereto, receives a command (TPC) from a mobile station (UE), changes its transmitted power in response to the command (TPC) by means of the transmit power controller (PCR), transmits information (PL1) about its current transmitted power to the base station controller (SRNC), receives from the base station controller (SRNC) a correction value (CV1) for its transmitted power, stores the correction value (CV1) in the memory (MEM), and additionally changes its transmitted power by said correction value (CV1) by means of the transmit power controller (PRC); wherein the base station controller (CRNC1) connected directly to the base station (NB1) is structured to determine the traffic load in the forward direction and to communicate the traffic load to the base station controller (SRNC), which is structured to calculate the correction value (CV1) based on the traffic load.

15. A base station controller (SRNC) which is connected to at least two base stations (NB1, NB2) in a mobile communications systems (MTS), receives information (PL1; PL2) about its current transmitted power from said base stations (NB1, NB2) and evaluates said information, calculates a correction value (CV1) for at least one (NB1) of the base stations therefrom, and, in addition to changing its transmitted power in response to a command (TCP) from a mobile station (UE), changes its transmitted power by said correction value (CV1); wherein the base station controllers (CRNC1, CRNC2) connected directly to the base stations (NB1, NB2) are structured to determine the traffic loads in the forward direction and to communicate the traffic loads to the base station controller (SRNC), which is structured to calculate the correction value (CV1) based on the traffic loads.

16. A mobile communications system (MTS) comprising: at least two base stations (NB1, NB2) communicating simultaneously, at least temporarily, with a mobile station (UE), the mobile station (UE) sending to the base stations (NB1, NB2) a command (TPC) instructing the base stations (NB1, NB2) to change their transmitted powers, each (NB1) of the base stations comprising a memory (MEM) and a transmit power controller (PCR) connected thereto for changing its transmitted power in response to the command (TPC); and at least one base station controller (SRNC) to which each of the base stations (NB1, NB2) transmits information (PL1, PL2) about its current transmitted power, and which calculates a correction value (CV1) for the power transmitted by at least one (NB1) of the base stations and transmits it to said base station (NB1), which stores the correction value (CV1) in the memory (MEM) in order to additionally change its transmitted power by said correction value (CV1) by means of the transmit power controller (PCR); wherein the base station controllers (CRNC1, CRNC2) connected directly to the base stations (NB1, NB2) are structured to determine the traffic loads in the forward direction and to communicate the traffic loads to the base station controller (SRNC), which is structured to calculate the correction value (CV1) based on the traffic loads.

* * * * *